US011799941B2

(12) United States Patent
Viet et al.

(10) Patent No.: US 11,799,941 B2
(45) Date of Patent: Oct. 24, 2023

(54) HANDLING CONNECTION POOL SIZING WITH HETEROGENEOUS CONCURRENCY

(71) Applicant: Red Hat, Inc., Raleigh, NC (US)

(72) Inventors: Julien Viet, Paris La Defense (FR); Thomas Segismont, Paris La Defense (FR)

(73) Assignee: Red Hat, Inc., Raleigh, NC (US)

( * ) Notice: Subject to any disclaimer, the term of this patent is extended or adjusted under 35 U.S.C. 154(b) by 38 days.

(21) Appl. No.: 17/468,364

(22) Filed: Sep. 7, 2021

(65) Prior Publication Data

US 2023/0075236 A1 Mar. 9, 2023

(51) Int. Cl.
*H04L 67/01* (2022.01)
*H04L 47/78* (2022.01)
*H04L 47/762* (2022.01)
*H04L 67/02* (2022.01)

(52) U.S. Cl.
CPC ............ *H04L 67/01* (2022.05); *H04L 47/762* (2013.01); *H04L 47/781* (2013.01); *H04L 67/02* (2013.01)

(58) Field of Classification Search
CPC ..... H04L 47/762; H04L 47/781; H04L 67/01; H04L 67/02
See application file for complete search history.

(56) References Cited

U.S. PATENT DOCUMENTS

| | | | |
|---|---|---|---|
| 6,167,423 A * | 12/2000 | Chopra | G06F 9/546 718/100 |
| 8,539,504 B2 | 9/2013 | Bigelis et al. | |
| 9,547,536 B2 | 1/2017 | Retnakumari et al. | |

(Continued)

FOREIGN PATENT DOCUMENTS

CN 112181652 A 1/2021

OTHER PUBLICATIONS

Bhargava, Neeraj et al., "Database Optimization by Connection Pooling for Heterogeneous Users," International Journal of Emerging Technologies and Applications in Engineering, Technologies and Sciences, 2011, 148-152, vol. 4, Issue No. 2, India, https://www.academia.edu/1849666/DATABASE_OPTIMIZATION_BY_CONNECTION_POOLING_FOR_HETEROGENEOUS_USERS.

(Continued)

*Primary Examiner* — Jeong S Park
(74) *Attorney, Agent, or Firm* — Womble Bond Dickinson (US) LLP (57) ABSTRACT

A system and method for handling connection pool sizing with heterogeneous concurrency. The method includes executing, by a processing device of a client device, a connection pool to manage persistent connections for the client device. The method includes executing, by the processing device, an application to cause the application to send a request to the connection pool for a first persistent connection of a first connection type to the remote server. The method includes determining an available capacity of the connection pool to provide, to the application, the first persistent connection of the first connection type to the remote server. The method includes establishing, by the connection pool, the first persistent connection of the first connection type to the remote server. The method includes granting, by the connection pool to the application, access to the first persistent connection of the first connection type to the remote server.

20 Claims, 5 Drawing Sheets

(56) References Cited

U.S. PATENT DOCUMENTS

| | | |
|---|---|---|
| 9,563,475 B2 | 2/2017 | Jain et al. |
| 10,909,211 B2 | 2/2021 | De Lavarene et al. |
| 2004/0088413 A1* | 5/2004 | Bhogi ................... G06F 9/5061 |
| | | 709/226 |
| 2007/0118596 A1* | 5/2007 | Patiejunas ............... H04L 67/02 |
| | | 709/203 |
| 2009/0034537 A1* | 2/2009 | Colrain ................... H04L 67/61 |
| | | 370/400 |
| 2012/0278385 A1* | 11/2012 | Papakipos ........... H04L 12/6418 |
| | | 709/227 |
| 2013/0091286 A1* | 4/2013 | Spencer ................. H04L 69/16 |
| | | 709/226 |
| 2013/0142040 A1* | 6/2013 | Fryer ............... H04L 12/40065 |
| | | 370/230 |
| 2016/0006805 A1* | 1/2016 | Ulupinar ................. H04L 67/02 |
| | | 709/217 |
| 2021/0081427 A1 | 3/2021 | Obembe et al. |
| 2021/0144704 A1* | 5/2021 | Kim .................... H04L 27/2602 |

OTHER PUBLICATIONS

Oracle, "Oracle® C++ Call Interface Programmer's Guide," 1999-2005, https://web.stanford.edu/dept/itss/docs/pracle/10gR2/appdev.102/b14294/relational.htm.

* cited by examiner

400 executing, by a processing device of a client device, a connection pool to manage persistent connections for the client device
402 executing, by the processing device, an application to cause the application to send a request to the connection pool for a first persistent connection of a first connection type to the remote server
404 determining, by the connection pool, an available capacity of the connection pool to provide, to the application, the first persistent connection of the first connection type to the remote server
406 establishing, by the connection pool responsive to determining the available capacity to provide the first persistent connection of the first connection type, the first persistent connection of the first connection type to the remote server
408 granting, by the connection pool to the application, access to the first persistent connection of the first connection type to the remote server
410

HANDLING CONNECTION POOL SIZING WITH HETEROGENEOUS CONCURRENCY

TECHNICAL FIELD

The present disclosure relates generally to software technology, and more particularly, to systems and methods for handling connection pool sizing with heterogeneous concurrency.

BACKGROUND

Hypertext transfer protocol (HTTP) persistent connections is an instruction that allows a single TCP connection to remain open for multiple HTTP requests/responses. By default, HTTP connections close after each request. When a computing device visits a webpage, its browser needs to create new connections to request each of the files that construct the web pages (e.g. images, Javascript, and CSS stylesheets). This process can often lead to high page load times.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A persistent connection is a network communication channel that remains open for further requests and responses rather than closing after a single exchange. Persistent connections added for the hypertext transfer protocol 1.1 (HTTP/1.1) use an extra header to request the client device to keep the connection alive. HTTP/1.1 assumes that all connections are to be persistent unless otherwise specified.

HTTP/1.1 evolved into HTTP 2.0 and then into H2, which is HTTP 2.0 over transport layer security (TLS). With the rise of H2, client devices often face the need to handle pools of connections with heterogeneous concurrencies. These connection pools play an important role for performance of the network infrastructure and the computing devices (e.g., client devices, remote servers) operating on the network infrastructure.

However, the maximum number of connections might vary with the connection concurrency. For example, a connection pool could define a maximum of 20 connections for the HTTP/1.1 protocol and a maximum of 2 connections for the H2 protocol. In addition, connection concurrency is not known before the connection is established. As a result, the attempts by a client device to establish H2 connections to a remote server that only supports HTTP/1.1 connections (or vice versa) could overburden the remote server because the client device will send repeated connection requests to the remote server to establish the H2 connections, which causes the remote server to process the connection requests, even though it does not establish the H2 connection. Thus, the repeated requests may overburden the remote server such that the remote server has a reduced capability to manage its other connections to other client devices.

Furthermore, when the client device handles multiple concurrent requests, these requests may be placed into a queue (e.g., parked) until the initial connection is established, but the initial decision to queue the request is not optimal with heterogeneous connections. For example, the remote server might support multiple connection protocols due to connection load balancing which would preclude the client device to use a connection with different capacity. While a client device could use dedicated pools for each kind of connection, the pool sizing would create more connections than necessary. Thus, the repeated requests for unsupported connection types and the multiple connections created by dedicated pools for each connection type consumes excess networking resource, as well as, unnecessary increases in network congestion and power consumption for the overall network infrastructure.

Aspects of the present disclosure address the above-noted and other deficiencies by handling connection pool sizing with heterogeneous concurrency. Benefits of using the one or more embodiments of the present disclosure for handling connection pool sizing with heterogeneous concurrency may include a reduction in networking resources to handle heterogeneous connection types, as well as, a decrease in network congestion and power consumption for the overall network infrastructure.

As discussed in greater detail below, a client device may execute a connection pool that is configured to manage persistent connections for the client device. The client device may execute an application to cause the application to send a request to the connection pool for a persistent connection (e.g., HTTP/1.1, H2) of a connection type to the remote server. The connection pool may determine an available capacity of the connection pool to provide, to the application, the persistent connection of the connection type to the remote server. The connection pool may establish, responsive to determining the available capacity to provide the persistent connection of the connection type, the persistent connection of the connection type to the remote server. The connection pool may grant, to the application, access to the persistent connection of the connection type to the remote server. The connection pool may receive, from the application, a message indicating that the application has released, to the connection pool, the persistent connection of the connection type to the remote server. The connection pool may maintain, responsive to receiving the message, the persistent connection of the connection type to the remote server. The connection pool may receive, from the application, a second request for a persistent connection of the connection type to the remote server. The connection pool may grant, to the application, access to re-use the persistent connection that the connection pool is already maintaining; thereby avoiding having to spend the additional time to re-establish the persistent connection of the connection type with the remote server.

Figure 1:
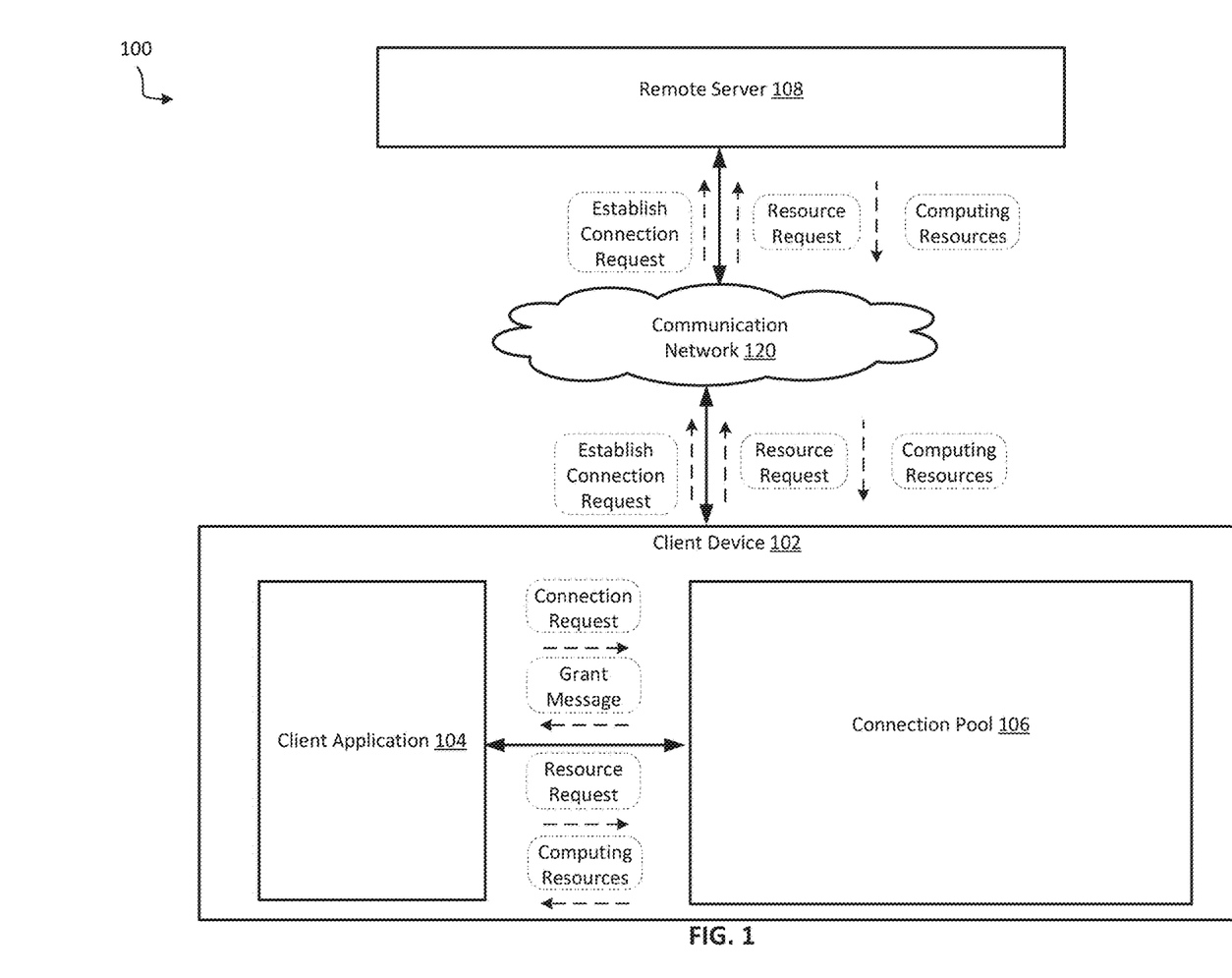
FIG. 1 is a block diagram depicting an example environment for handling connection pool sizing with heterogeneous concurrency, according to some embodiments.

FIG. 1 is a block diagram depicting an example environment for handling connection pool sizing with heterogeneous concurrency, according to some embodiments. The environment 100 includes a client device 102 and a remote server 108 that are communicably coupled together via a communication network 120. The client device 102 includes and/or executes an application (shown in FIG. 1 as, "client application 104"). The client device 102 includes and/or executes a connection pool 106.

The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g. cell towers), etc. The communication network 120 may carry communications (e.g., data, message, packets, frames, etc.) between any other the computing device.

As shown in FIG. 1, the client device 102 may execute the connection pool 106, where the connection pool 106 is configured to establish and/or manage, for the client device 102, persistent connections of the same (e.g., homogenous) connection type or a combination of different (e.g., heterogeneous) connection types. For example, the client device 102 may configure the connection pool 106 to establish and/or manage persistent connections between the client device 102 and one or more remote servers (e.g., remote server 108).

The client device 102 may execute the client application 104 to cause the client application 104 to send (e.g., transmit, deliver, provide) a request (shown in FIG. 1 as, "connection request") to the connection pool 106 for a persistent connection between the client device 102 (or the client application 104) and the remote server 108, where the request indicates that the client device 102 wants the persistent connection to be of a particular connection type. For example, the client device 102 may indicate in the request that the persistent connection type should be HTTP/1.1 or H2. The connection pool 106 may determine (e.g., calculate, measure) an available capacity of the connection pool 106 to provide, to the client application 104, the persistent connection of the connection type between the client device 102 and the remote server 108.

The connection pool 106 may establish, responsive to determining that the connection pool 106 has the available capacity to provide the persistent connection of the connection type, the persistent connection of the connection type between the client device 102 and the remote server 108 by sending a message (shown in FIG. 1 as, "establish connection request") to the remote server 108. In some embodiments, the message establishes the persistent connection between the client device 102 and the remote server 108, or the message causes the remote server 108 to establish the persistent connection between the client device 102 and the remote server 108. In response to establishing the persistent connection, the client device 102 may grant (e.g., authorize, approve), to the client application 104, access to the persistent connection of the connection type to the remote server 108. For example, the client device 102 may send a message (shown in FIG. 1 as, "grant message") to the client application 104, where the message includes a connection instance that represents the persistent connection to the remote server 108.

Now that the persistent connection is established, the client application 104 may send, via the persistent connection, a request (shown in FIG. 1 as, "resource request") to the remote server 108 for one or more computing resources (e.g., networking resources, data storage resources, processing resources, one or more files, etc.) associated with the remote server 108, which causes the remote server 108 to send, via the persistent connection, the one or more computing resources (shown in FIG. 1 as, "computing resources") to the client application 104.

Although FIG. 1 shows only a select number of computing devices (e.g., client device 102 and remote server 108) and executable components (e.g., client application 104, connection pool 106); the environment 100 may include any number of computing devices and/or executable components that are interconnected in any arrangement to facilitate the exchange of data between the computing devices.

Figure 2A:
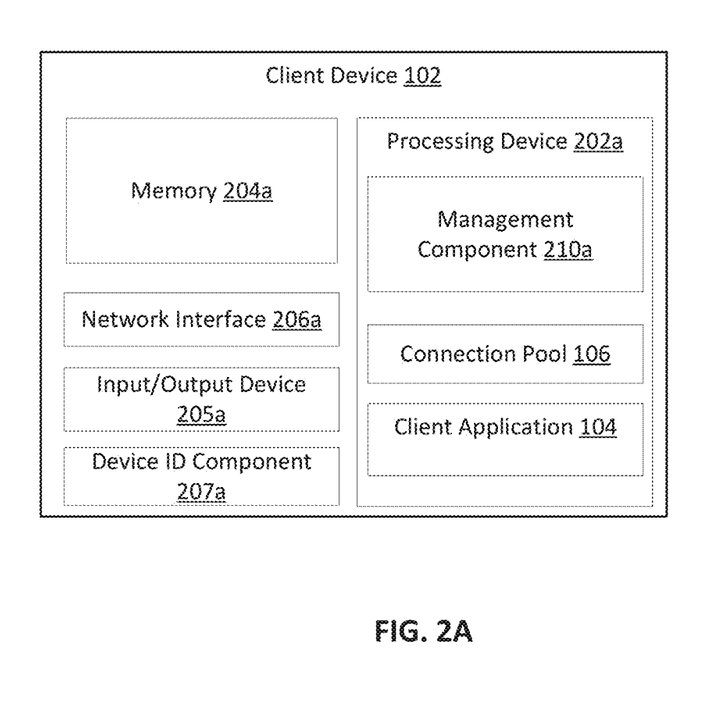
FIG. 2A is a block diagram depicting an example of the client device 102 in FIG. 1, according to some embodiments.

FIG. 2A is a block diagram depicting an example of a client device 102 in FIG. 1, according to some embodiments. While various devices, interfaces, and logic with particular functionality are shown, it should be understood that the client device 102 includes any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The client device 102 includes a processing device 202a (e.g., general purpose processor, a PLD, etc.), which may be composed of one or more processors, and a memory 204a (e.g., synchronous dynamic random access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may comprise one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the client device 102. In some embodiments, the processing device 202a and the memory 204a form various processing devices and/or circuits described with respect to the client device 102. The instructions include code from any suitable computer programming language such as, but not limited to, C, C++, C#, Java, JavaScript, VBScript, Perl, HTML, XML, Python, TCL, and Basic.

The processing device 202a may include and/or execute an application (shown in FIG. 2A as, "client application 104") that is displayed on a computer screen of the client device 102. In some embodiments, the client application 104 may be an application that is or has undergoing one or more stages of a software development process for the purpose of developing the application into a final product for private use, public use, and/or commercial use. In some embodiments, the client application 104 may be an application that has been released as final product for private use, public use, and/or commercial use. In some embodiments, the client application 104 may be configured to need one or more computing resources (e.g., networking resources, data storage resources, processing resources, one or more files) in order to completely execute (e.g., execute without error and/or interruption).

In some embodiments, an execution of the client application 104 may cause the client application 104 to send a request (shown in FIG. 1 as, "connection request") to a connection pool (e.g., connection pool 106) for a persistent connection of a connection type between the client device 102 and the remote server 108. In some embodiments, the client application 104 may be configured to send, to a management component (e.g., management component 210a) of the client device 102, a plurality of pool sizes that are each associated with a respective connection type (e.g., HTTP/1.1, H2).

In some embodiments, the client application 104 may acquire a connection to the connection pool 106 without sending a request for a specific kind of connection. In some embodiments, although the connection in the connection pool 106 might have different concurrencies, the service offered by the connection pool 106 does not depend on the kind of the connection. For example, when the client device 102 wants an HTTP connection it does not care whether it is HTTP/1 or H2 as both will deliver the same service from the client device 102 perspective.

In some embodiments, the client application 104 may be configured to receive (e.g., retrieve, obtain, acquire) a message (shown in FIG. 1 as, "grant message") from the connection pool 106, where the message indicates that the client application 104 has been granted access to the persistent connection of the connection type between the client device 102 and the remote server 108. In some embodiments, a persistent connection of the connection type may include a plurality of connections of the same connection type, where a total count of the plurality of connections is determined based on a pool size that is associated with the connection type. In some embodiments, the pool size impacts a performance level for the client application 104. For example, a low pool size causes the connection pool 106 to establish, responsive to receiving a request from the client application 104 for a persistent connection, a fewer number of connections (e.g., a lower bandwidth) between the client device 102 and the remote server 108 as compared to a high pool size (e.g., a higher bandwidth). In some embodiments, the message may include a connection instance that represents the persistent connection to the remote server 108.

In some embodiments, the client application 104 may be configured to send, via the persistent connection of the connection type and/or using the connection instance, a request (shown in FIG. 1 as, "resource request") to the remote server 108 for one or more computing resources associated with the remote server 108. In some embodiments, the client application 104 may be configured to receive, via the persistent connection of the connection type, the one or more computing resources (shown in FIG. 1 as, "computing resources") from the remote server 108 and/or access to the one or more computing resources associated with the remote server 108.

The processing device 202a may execute a management component 210a. In some embodiments, the management component 210a may be configured to launch and/or execute a connection pool (e.g., connection pool 106). In some embodiments, the management component 210a may be configured to launch (e.g., start, trigger, activate) the client application 104 to cause the client application 104 to execute on the processing device 202a.

In some embodiments, the management component 210a may be configured to receive, from the client application 104, a plurality of pool sizes that are each associated with a respective connection type (e.g., HTTP/1.1, H2). In some embodiments, the management component 210a may be configured to configure (e.g., initialize, program, modify) the connection pool 106 to manage and/or establish one or more persistent connections for the client device 102. In some embodiments, the management component 210a may be configured to provide a plurality of pool sizes to the connection pool 106, which the connection pool 106 may use to determine the number of persistent connections to establish responsive to receiving a request (shown in FIG. 1 as, "connection request") for a persistent connection of a connection type from the client application 104.

In some embodiments, the connection pool 106 may be configured to receive a request from the client application 104 for a first persistent connection of a first connection type (e.g., HTTP/1.1, H2) between the client device 102 and the remote server 108. In some embodiments, the connection pool 106 may be configured to determine an available capacity of the connection pool 106 to provide, to the client application 104, the first persistent connection of the first connection type to the remote server 108.

In some embodiments, the connection pool 106 may be configured to establish, responsive to determining the available capacity to provide the first persistent connection of the first connection type to the client application 104, the first persistent connection of the first connection type to the remote server 108. In some embodiments, the connection pool 106 may be configured to establish the first persistent connection of the first connection type by sending a message to the remote server 108, where the message establishes the first persistent connection of the first connection type between the client device 102 and the remote server 108. In some embodiments, the connection pool 106 may be configured to establish the first persistent connection of the first connection type by sending a request (shown in FIG. 1 as, "establish connection request") to the remote server 108 to establish the first persistent connection of the first connection type, where the message causes the remote server 108 to establish the first persistent connection of the first connection type between the client device 102 and the remote server 108.

In some embodiments, the connection pool 106 may be configured to grant, to the client application 104, access to the first persistent connection of the first connection type between the client device 102 and the remote server 108 responsive to establishing the first persistent connection.

In some embodiments, the connection pool 106 may be configured to receive, from the client application 104, a first pool size of the first connection type (e.g., H2) and a second pool size of a second connection type (e.g., HTTP/1.1). In some embodiments, the client application 104 sets (e.g., initializes) the pool size for each connection type according to performance criteria required from the client application 104. That is, a higher pool size (e.g., more persistent connections) will improve performance for the client application 104, while a lower pool size (e.g., less persistent connections) will decrease performance for the client application 104.

In some embodiments, the connection pool 106 may be configured to determine (e.g., calculate, measure) a maximum capacity of the connection pool based on the first pool size and the second pool size. In some embodiments, the first connection type and the second connection type may each correspond to a hypertext transfer protocol 1.1 (HTTP/1.1) or a hypertext transfer protocol 2.0 (H2). In some embodiments, the first connection type and the second connection type may be the same connection type (e.g., HTTP/1.1 or H2) or different connection types (e.g., HTTP/1.1 and H2).

In some embodiments, the connection pool 106 may be configured to determine, based on the first pool size and/or the maximum capacity, a first capacity factor (sometimes referred to as, "capacityFactor") that is indicative of an amount of capacity of the connection pool that is used by each persistent connection of the first connection type to the remote server. In some embodiments, the connection pool 106 may be configured to determine, based on the second pool size and the maximum capacity (sometimes referred to as, "maxCapacity"), a second capacity factor that is indicative of an amount of capacity of the connection pool that is used by each persistent connection of the second connection type to the remote server.

In some embodiments, the connection pool 106 may be configured to receive an indication that the remote server 108 has denied the attempts (or requests) by the connection pool to establish the first persistent connection between the client device 102 and the remote server 108. In some embodiments, the connection pool 106 may be configured to receive an indication that the remote server 108 has established (e.g., downgraded) the first persistent connection as a second connection type (e.g., HTTP/1.1) instead of the first connection type (e.g., H2).

In some embodiments, the connection pool 106 may be configured to update (e.g., correct), by the connection pool 106 based on the second capacity factor responsive to receiving the indication, a capacity utilization factor that is indicative of a total amount of capacity of the connection pool 106 that is currently being used by all persistent connections to the client device 102.

In some embodiments, the connection pool 106 may be configured to receive, from the client application 104, a second request for a second persistent connection of the first connection type to the remote server 108. In some embodiments, the connection pool 106 may be configured to establish the second persistent connection of the first connection type to the remote server. In some embodiments, the connection pool 106 may be configured to grant, to the client application 104, access to the second persistent connection of the first connection type to the remote server 108.

In some embodiments, the connection pool 106 may be configured to update, based on the first capacity factor responsive to establishing the first persistent connection of the first connection type between the client device 102 and the remote server 108, a capacity utilization factor that is indicative of a total amount of capacity of the connection pool 106 that is currently being used by all persistent connections to the client device 102.

In some embodiments, the connection pool 106 may be configured as a state machine that includes a plurality of states corresponding to a plurality of capacity utilization factors. In some embodiments, each state of the plurality of states is indicative of a respective capacity utilization factor for the connection pool. In some embodiments, the connection pool 106 may be configured to update the capacity utilization factor by transitioning from a first state of the plurality of states to a second state of the plurality of states.

In some embodiments, the connection pool 106 may be configured to determine whether the capacity utilization factor exceeds the maximum capacity of the connection pool. In some embodiments, the connection pool 106 may be configured to establish the first persistent connection of the first connection type to the remote server 108 even though the establishing of the first persistent connection of the first connection type to the remote server 108 causes the capacity utilization factor to exceed the maximum capacity of the connection pool 106.

In some embodiments, the connection pool 106 may be configured to receive, from the client application 104, a second request for a second persistent connection to the remote server 108. In some embodiments, the connection pool 106 may be configured to determine, responsive to receiving the second request, that the capacity utilization factor exceeds the maximum capacity of the connection pool. In some embodiments, the connection pool 106 may be configured to maintain, responsive to determining that the capacity utilization factor exceeds the maximum capacity of the connection pool 106, the second request in a queue until the capacity utilization factor indicates that the connection pool 106 has an available capacity to provide the second persistent connection to the remote server 108. In some embodiments, then the capacity utilization factor may be less than or equal to the maximum capacity of the connection pool 106.

In some embodiments, the connection pool 106 may be configured to receive, from the client application 104, a message (e.g., a close connection message) indicating that the client application 104 has released, to the connection pool 106, the persistent connection of the first connection type to the remote server 108. In some embodiments, the connection pool 106 may be configured to maintain, by the connection pool 106 responsive to receiving the message, the persistent connection of the first connection type to the remote server 108. That is, the connection pool 106 may maintain the persistent connection (without closing it) between the client device 102 and the remote server 108 because it may be more efficient to hold onto the persistent connection. For example, the connection pool 106 may receive another request for the persistent connection, and in response, the connection pool 106 may grant permission to the client application 104 to re-use the persistent connection that the connection pool 106 is already maintaining. Thus, the connection pool 106 may avoid having to spend the additional time to re-establish the persistent connection with the remote server 108.

In some embodiments, the connection pool 106 may be configured to receive, from the client application 104, a second request for a persistent connection of the first connection type to the remote server 108. In some embodiments, the connection pool 106 may be configured to grant, to the client application 104, access to reuse the persistent connection of the first connection type to the remote server 108 that the application previously released to the connection pool 106. In some embodiments, the granting, by the connection pool to the application, of the access to the first persistent connection causes the application to send, via the first persistent connection of the first connection type, a request for one or more computing resources from the remote server. In some embodiments, the granting, by the connection pool to the application, of the access to the first persistent connection causes the application to receive, via the first persistent connection of the first connection type, the one or more computing resources from the remote server.

The client device 102 includes a network interface 206a configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the client device 102 includes a plurality of network interfaces 206a of different types, allowing for connections to a variety of networks, such as local area networks (public or private) or wide area networks including the Internet, via different sub-networks.

The client device 102 includes an input/output device 205a configured to receive user input from and provide information to a user. In this regard, the input/output device 205a is structured to exchange data, communications, instructions, etc. with an input/output component of the client device 102. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the client device 102, such as a built-in display, touch screen, microphone, etc., or external to the housing of the client device 102, such as a monitor connected to the client device 102, a speaker connected to the client device 102, etc., according to various embodiments. In some embodiments, the client device 102 includes communication circuitry for facilitating the exchange of data, values, messages, and the like between the input/output device 205a and the components of the client device 102. In some embodiments, the input/output device 205a includes machine-readable media for facilitating the exchange of information between the input/output device 205a and the components of the client device 102. In still another embodiment, the input/output device 205a includes any combination of hardware components (e.g., a touchscreen), communication circuitry, and machine-readable media.

The client device 102 includes a device identification component 207a (shown in FIG. 2A as device ID component 207a) configured to generate and/or manage a device identifier associated with the client device 102. The device identifier may include any type and form of identification used to distinguish the client device 102 from other computing devices. In some embodiments, to preserve privacy, the device identifier may be cryptographically generated, encrypted, or otherwise obfuscated by any device and/or component of client device 102. In some embodiments, the client device 102 may include the device identifier in any communication (e.g., establish connection request, resource request) that the client device 102 sends to a computing device.

The client device 102 includes a bus (not shown), such as an address/data bus or other communication mechanism for communicating information, which interconnects the devices and/or components of client device 102, such as processing device 202a, network interface 206a, input/output device 205a, device ID component 207a, and management component 210a.

In some embodiments, some or all of the devices and/or components of client device 102 may be implemented with the processing device 202a. For example, the client device 102 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

Figure 2B:
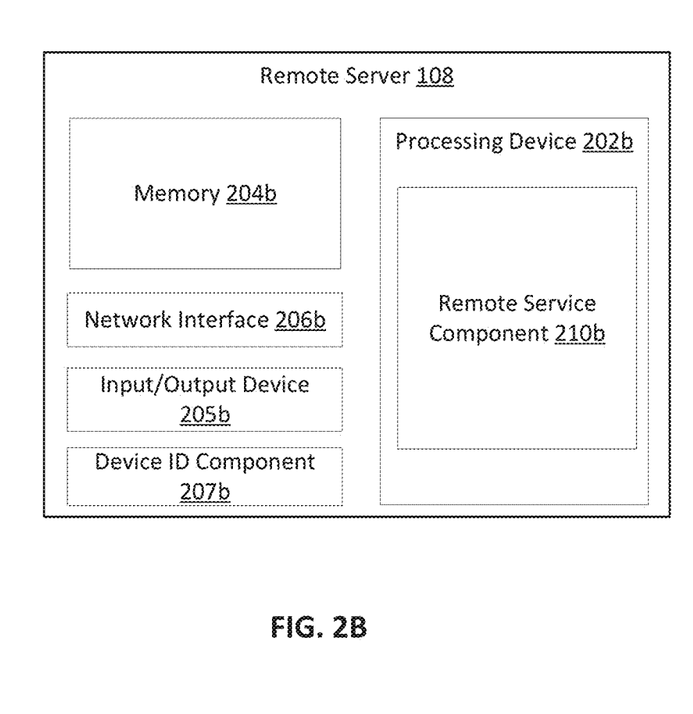
FIG. 2B is a block diagram depicting an example of the remote server 108 of the environment in FIG. 1, according to some embodiments.

FIG. 2B is a block diagram depicting an example of the remote server 108 of the environment in FIG. 1, according to some embodiments. While various devices, interfaces, and logic with particular functionality are shown, it should be understood that the remote server 108 includes any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The remote server 108 includes a processing device 202b (e.g., general purpose processor, a PLD, etc.), which may be composed of one or more processors, and a memory 204b (e.g., synchronous dynamic random access memory (DRAM), read-only memory (ROM)), which may communicate with each other via a bus (not shown). The processing device 202b includes identical or nearly identical functionality as processing device 202a in FIG. 2a, but with respect to devices and/or components of the remote server 108 instead of devices and/or components of the client device 102.

The memory 204b of processing device 202b stores data and/or computer instructions/code for facilitating at least some of the various processes described herein. The memory 204b includes identical or nearly identical functionality as memory 204a in FIG. 2A, but with respect to devices and/or components of the remote server 108 instead of devices and/or components of the client device 102.

The processing device 202b may execute a remote service component 210b that may be configured to receive a request (shown in FIG. 1 as, "establish connection request") to establish a persistent connection of a connection type between the client device 102 and the remote server 108. In some embodiments, the remote service component 210b may be configured to establish, in response to receiving the request, the persistent connection of the connection type between the client device 102 and the remote server 108. In some embodiments, the remote service component 210b may be configured to establish, in response to receiving the request, the persistent connection of the connection type between the client device 102 and the remote server 108.

In some embodiments, the remote service component 210b may be configured to receive, via a persistent connection, a request (shown in FIG. 1 as, "resource request") from the client application 104 for one or more computing resources (e.g., networking resources, data storage resources, processing resources, one or more files, etc.) that are associated with the remote server 108, and in response, send, via the persistent connection, the one or more computing resources (shown in FIG. 1 as, "computing resources") to the client application 104.

In some embodiments, the remote service component 210*b* may be configured to determine that the remote service component 210*b* does not have the available capacity to establish the persistent connection of the connection type (e.g., H2) that is requested by the client device 102, and in response, establish the persistent connection as a downgraded connection type (e.g., HTTP/1.1). In some embodiments, the remote service component 210*b* may be configured to send a message to the client device 102 that indicates that the remote server 108 has established the persistent connection as a downgraded connection type (e.g., HTTP/1.1) instead of the requested connection type (e.g., H2).

The remote server 108 includes a network interface 206*b* configured to establish a communication session with a computing device for sending and receiving data over a network to the computing device. Accordingly, the network interface 206*b* includes identical or nearly identical functionality as network interface 206*a* in FIG. 2A, but with respect to devices and/or components of the remote server 108 instead of devices and/or components of the client device 102.

The remote server 108 includes an input/output device 205*b* configured to receive user input from and provide information to a user. In this regard, the input/output device 205*b* is structured to exchange data, communications, instructions, etc. with an input/output component of the remote server 108. The input/output device 205*b* includes identical or nearly identical functionality as input/output device 205*a* in FIG. 2A, but with respect to devices and/or components of the remote server 108 instead of devices and/or components of the client device 102.

The remote server 108 includes a device identification component 207*b* (shown in FIG. 2B as device ID component 207*b*) configured to generate and/or manage a device identifier associated with the remote server 108. The device ID component 207*b* includes identical or nearly identical functionality as device ID component 207*a* in FIG. 2A, but with respect to devices and/or components of the remote server 108 instead of devices and/or components of the client device 102.

The remote server 108 includes a bus (not shown), such as an address/data bus or other communication mechanism for communicating information, which interconnects the devices and/or components of the remote server 108, such as processing device 202*b*, network interface 206*b*, input/output device 205*b*, device ID component 207*b*, and the remote service component 210*b*.

In some embodiments, some or all of the devices and/or components of remote server 108 may be implemented with the processing device 202*b*. For example, the remote server 108 may be implemented as a software application stored within the memory 204*b* and executed by the processing device 202*b*. Accordingly, such embodiment can be implemented with minimal or no additional hardware costs. In some embodiments, any of these above-recited devices and/or components rely on dedicated hardware specifically configured for performing operations of the devices and/or components.

Figure 3:
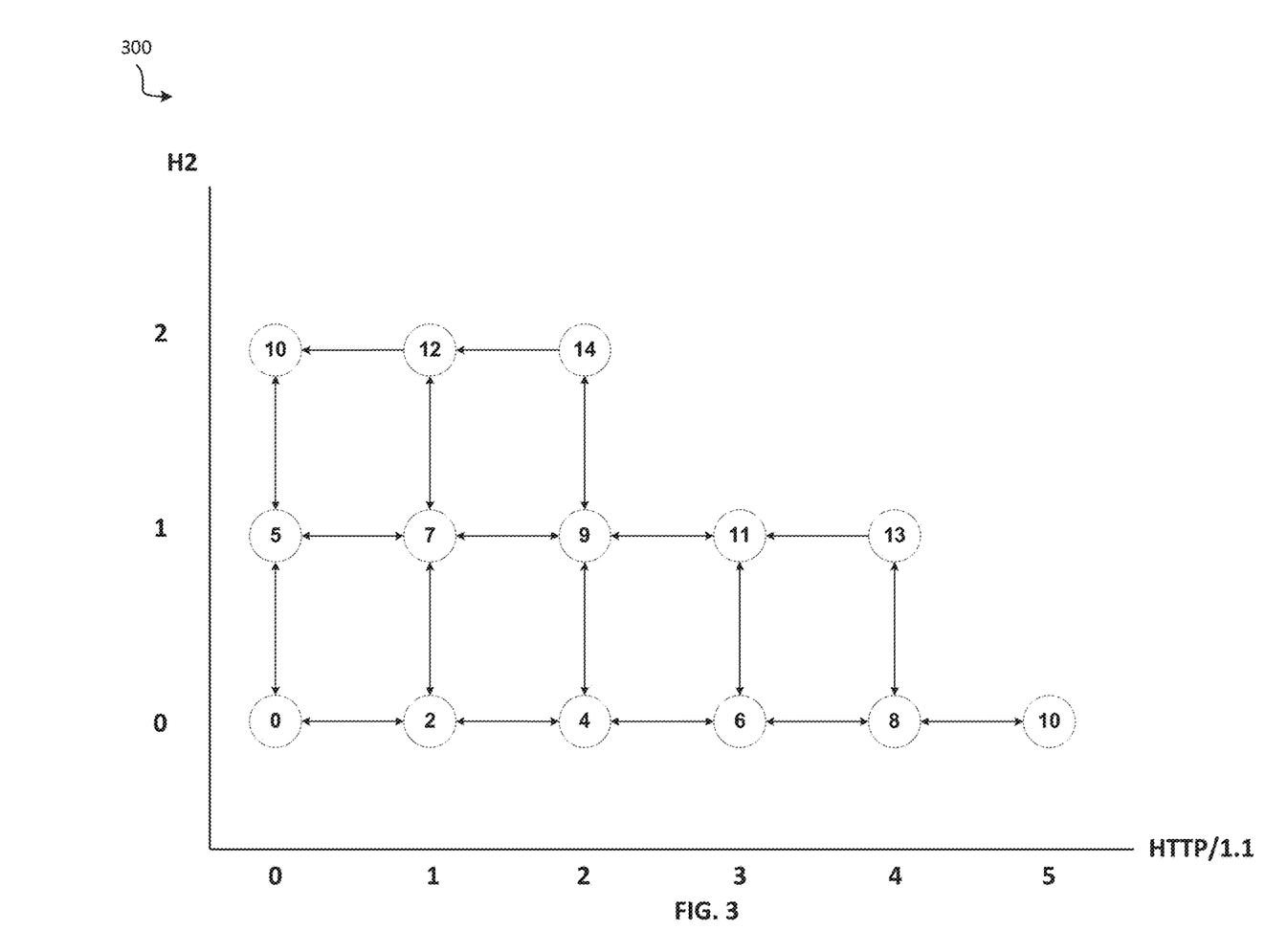
FIG. 3 is a state diagram depicting an example set of states of the connection pool 106 in FIG. 1 for handling connection pool sizing with heterogeneous concurrency, according to some embodiments.

FIG. 3 is a state diagram depicting an example set of states of the connection pool 106 in FIG. 1 for handling connection pool sizing with heterogeneous concurrency, according to some embodiments. The state diagram 300 includes a plurality of states of the connection pool 106, where each state indicates a capacity utilization factor of the connection pool 106 when maintaining one or more HTTP/1.1 connections (x-axis) and/or one or more H2 connections (y-axis). A capacity utilization factor indicates a total amount of capacity of the connection pool 106 that is currently being used by all persistent connections (e.g., HTTP/1.1, H2) to the client device 102.

In some embodiments, the connection pool 106 may be configured to establish and/or manage 'n' kinds of connections, where each kind (e.g., HTTP/1.2, H2) of connection is associated with its own maximum size (sometimes referred to as, "max pool size"). In some embodiments, the maximum number of connections the connection pool 106 can handle for the given kind of connection is maxSize[k]. In some embodiments, the connection pool 106 may not create a number of connections, for each connection type, that exceeds the maxSize[k] (e.g., max pool size). In some embodiments, the connection pool 106 may be configured to establish and/or manage any kind of connection, for example, a connection using HTTP/1.2, a connection using H2, a connection to a database, etc.

In some embodiments, the connection pool 106 may be configured to maintain a capacity value that varies between 0 and maxCapacity that the connection pool 106 computes using the following equation:

$$\text{maxCapacity} = \text{maxSize}[1] * \text{maxSize}[2] \ldots \text{maxSize}[n-1] * \text{maxSize}[n] \quad (1)$$

In some embodiments, a connection may only be established when the pool capacity is less than the maxCapacity. In some embodiments, when the connection can be established for the kind 'k', the capacity is increased by a capacityFactor that the connection pool 106 computes using the following equation:

$$capacityFactor = \frac{\text{max}Capacity}{\text{max}Size[k]} \quad (2)$$

In some embodiments, the capacity may be greater than the maxCapacity. In some embodiments, when the connection is established, the pool capacity is corrected with the capacityFactor for the established connection.

For example, the client device 102 may be configured to define a maximum pool size of 5 for HTTP/1.1 connections and 2 for H2 connections. In this instance, the client device 102 may be configured to calculate a maximum capacity of 10 (e.g., 2*5=10) for the HTTP/1.1 connection according to the following equation (1). The client device 102 may be configured to calculate a capacity factor of 2 (e.g., 10/5=2) for the HTTP/1.1 connections according to equation (2). The client device 102 may be configured to calculate a capacity factor of 5 (e.g., 10/2=5) for the H2 connections according to equation (2).

Referring back to FIG. 3, in some embodiments, the remote server 108 may establish the persistent connection according to the connection type that the connection pool 106 has requested. For example, the initial capacity of the connection pool 106 may be 0. The connection pool 106 may send a request to the remote server 108 to establish a first persistent connection of a first connection type (e.g., H2). In response, the remote server 108 may establish the first persistent connection of the first connection type, and compute a capacity utilization factor (sometimes referred to as, "capacity") of 5. The connection pool 106 may send a second request to the remote server 108 to establish a second persistent connection of the first connection type. In response, the remote server 108 may establish the first persistent connection of the first connection type (e.g., H2), and compute a capacity utilization factor of 10.

In some embodiments, the remote server 108 may downgrade all of the persistent connection from a first connection type that the connection pool 106 has requested to a second connection type. For example, the initial capacity of the connection pool 106 may be 0. The connection pool 106 may send a request to the remote server 108 to establish a first persistent connection of an H2 connection, which would cause the capacity utilization factor to increase to 5 (e.g., 0+capacityFactor[H2]). However, in response to receiving the request, the remote server 108 establishes the first persistent connection of an HTTP/1.1 connection, which causes the capacity utilization factor to increase to only 2 (e.g., 0+capacityFactor[HTTP/1.1]).

The connection pool 106 may send a second request to the remote server 108 to establish a second persistent connection of an H2 connection, which would cause the capacity utilization factor to increase to 7 (e.g., 2+capacityFactor[H2]). However, in response to receiving the request, the remote server 108 establishes the second persistent connection of an HTTP/1.1 connection, which causes the capacity utilization factor to increase to only 4 (e.g., 2+capacityFactor[HTTP/1.1]).

The connection pool 106 may send a third request to the remote server 108 to establish a third persistent connection of an H2 connection, which would cause the capacity utilization factor to increase to 9 (e.g., 4+capacityFactor[H2]). However, in response to receiving the request, the remote server 108 establishes the third persistent connection of an HTTP/1.1 connection, which causes the capacity utilization factor to increase to only 6 (e.g., 4+capacityFactor[HTTP/1.1]).

The connection pool 106 may send a fourth request to the remote server 108 to establish a fourth persistent connection of an H2 connection, which would cause the capacity utilization factor to increase to 11 (e.g., 6+capacityFactor[H2]). However, in response to receiving the request, the remote server 108 establishes the fourth persistent connection of an HTTP/1.1 connection, which causes the capacity utilization factor to increase to only 8 (e.g., 6+capacityFactor[HTTP/1.1]).

The connection pool 106 may send a fifth request to the remote server 108 to establish a fifth persistent connection of an H2 connection, which would cause the capacity utilization factor to increase to 13 (e.g., 8+capacityFactor[H2]). However, in response to receiving the request, the remote server 108 establishes the fifth persistent connection of an HTTP/1.1 connection, which causes the capacity utilization factor to increase to only 10 (e.g., 8+capacityFactor[HTTP/1.1]). In the end, the connection pool 106 is full with 5 HTTP/1.1 connections.

In some embodiments, the remote server 108 may downgrade only some of the persistent connection from a first connection type that the connection pool 106 has requested to a second connection type, such that there is a mix (e.g., heterogeneous connection types) of persistent connections of a first connection type and a second connection type between the client device 102 and the remote server 108. For example, the initial capacity of the connection pool 106 may be 0. The connection pool 106 may send a request to the remote server 108 to establish a first persistent connection of an H2 connection, which would cause the capacity utilization factor to increase to 5 (e.g., 0+capacityFactor[H2]). However, in response to receiving the request, the remote server 108 establishes the first persistent connection of an HTTP/1.1 connection, which causes the capacity utilization factor to increase to only 2 (e.g., 0+capacityFactor[HTTP/1.1]).

The connection pool 106 may send a second request to the remote server 108 to establish a second persistent connection of an H2 connection. In response, the remote server 108 establishes the second persistent connection of the H2 connection, which causes the capacity utilization factor to increase to 7 (e.g., 2+capacityFactor[H2]).

The connection pool 106 may send a third request to the remote server 108 to establish a third persistent connection of an H2 connection, which would cause the capacity utilization factor to increase to 12 (e.g., 0+capacityFactor[H2]). However, in response to receiving the request, the remote server 108 establishes the third persistent connection of an HTTP/1.1 connection, which causes the capacity utilization factor to increase to only 9 (e.g., 7+capacityFactor[HTTP/1.1]).

The connection pool 106 may send a fourth request to the remote server 108 to establish a fourth persistent connection of an H2 connection, which would cause the capacity utilization factor to increase to 14 (e.g., 0+capacityFactor[H2]). However, in response to receiving the request, the remote server 108 establishes the fourth persistent connection of an HTTP/1.1 connection, which causes the capacity utilization factor to increase to only 11 (e.g., 9+capacityFactor[HTTP/1.1]). In the end, the connection pool 106 is full with 1 H2 connection and 3 HTTP/1.1 connections.

Figure 4:
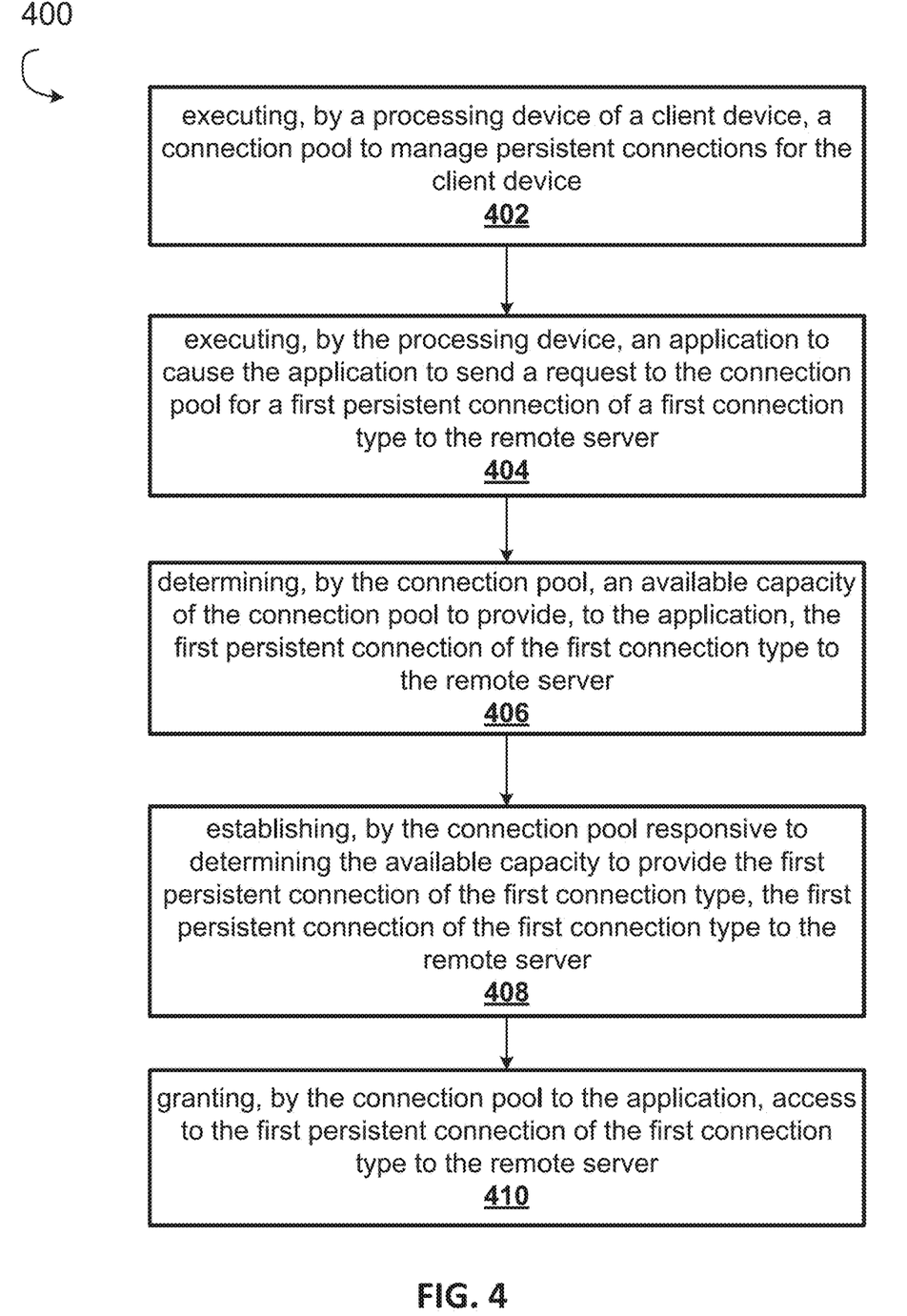
FIG. 4 is a flow diagram depicting a method for handling connection pool sizing with heterogeneous concurrency, according to some embodiments.

FIG. 4 is a flow diagram depicting a method for handling connection pool sizing with heterogeneous concurrency, according to some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 400 may be performed by a client device, such as client device 102 in FIG. 1. In some embodiments, method 400 may be performed by a remote server 108, such as remote server 108 in FIG. 1

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

As shown in FIG. 4, the method 400 includes the block 402 of executing, by a processing device of a client device, a connection pool to manage persistent connections for the client device. The method 400 includes the block 404 of executing, by the processing device, an application to cause the application to send a request to the connection pool for a first persistent connection of a first connection type to the remote server. The method 400 includes the block 406 of determining, by the connection pool, an available capacity of the connection pool to provide, to the application, the first persistent connection of the first connection type to the remote server. The method 400 includes the block 408 of establishing, by the connection pool responsive to determining the available capacity to provide the first persistent connection of the first connection type, the first persistent connection of the first connection type to the remote server. The method 400 includes the block 410 of granting, by the connection pool to the application, access to the first persistent connection of the first connection type to the remote server.

Figure 5:
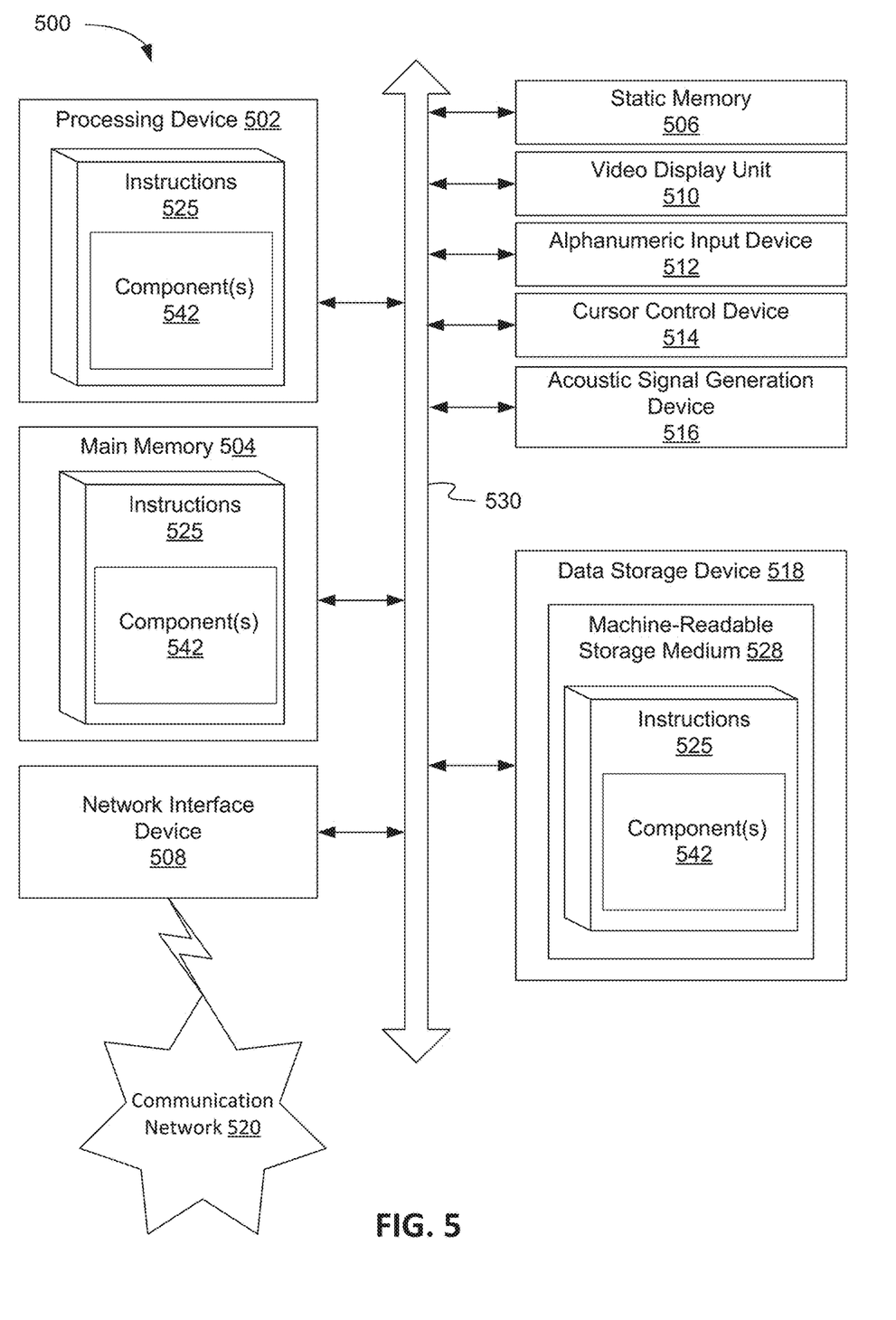
FIG. 5 is a block diagram of an example computing device 500 that may perform one or more of the operations described herein, in accordance with some embodiments.

FIG. 5 is a block diagram of an example computing device 500 that may perform one or more of the operations described herein, in accordance with some embodiments. Computing device 500 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 500 may include a processing device (e.g., a general purpose processor, a PLD, etc.) 502, a main memory 504 (e.g., synchronous dynamic random access memory (DRAM), read-only memory (ROM)), a static memory 506 (e.g., flash memory and a data storage device 518), which may communicate with each other via a bus 530.

Processing device 502 may be provided by one or more general-purpose processing devices such as a microprocessor, central processing unit, or the like. In an illustrative example, processing device 502 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 502 may also comprise one or more special-purpose processing devices such as an application specific integrated circuit (ASIC), a field programmable gate array (FPGA), a digital signal processor (DSP), network processor, or the like. The processing device 502 may be configured to execute the operations described herein, in accordance with one or more aspects of the present disclosure, for performing the operations and steps discussed herein.

Computing device 500 may further include a network interface device 508 which may communicate with a communication network 520. The computing device 500 also may include a video display unit 510 (e.g., a liquid crystal display (LCD) or a cathode ray tube (CRT)), an alphanumeric input device 512 (e.g., a keyboard), a cursor control device 514 (e.g., a mouse) and an acoustic signal generation device 516 (e.g., a speaker). In one embodiment, video display unit 510, alphanumeric input device 512, and cursor control device 514 may be combined into a single component or device (e.g., an LCD touch screen).

Data storage device 518 may include a computer-readable storage medium 528 on which may be stored one or more sets of instructions 525 that may include instructions for one or more components 542 (e.g., management component 210a in FIG. 2A, remote service component 210b in FIG. 2B) for carrying out the operations described herein, in accordance with one or more aspects of the present disclosure. Instructions 525 may also reside, completely or at least partially, within main memory 504 and/or within processing device 502 during execution thereof by computing device 500, main memory 504 and processing device 502 also constituting computer-readable media. The instructions 525 may further be transmitted or received over a communication network 520 via network interface device 508.

While computer-readable storage medium 528 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "executing," "determining," "establishing," "granting," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:

executing, by a processing device of a client device, a connection pool to manage persistent connections for the client device, wherein the connection pool is a state machine that comprises a plurality of possible states corresponding to a plurality of capacity utilization factors, wherein a capacity utilization factor indicates a total amount of capacity of the connection pool that is currently being used by a first connection type and a second connection type of persistent connections, wherein a first persistent connection of the first connection type and a second persistent connection of the second connection type use a different capacity of the connection pool;

executing, by the processing device, an application to cause the application to send a request to the connection pool for the first persistent connection of the first connection type to the remote server;

determining, by the connection pool, an available capacity of the connection pool to provide, to the application, the first persistent connection of the first connection type to the remote server;

establishing, by the connection pool responsive to determining the available capacity to provide the first persistent connection of the first connection type, the first persistent connection of the first connection type to the remote server; and granting, by the connection pool to the application, access to the first persistent connection of the first connection type to the remote server.

2. The method of claim 1, further comprising:

receiving, by the connection pool from the application, a first pool size of the first connection type and a second pool size of the second connection type; and determining, by the connection pool, a maximum capacity of the connection pool based on the first pool size and the second pool size.

3. The method of claim 2, wherein the first connection type and the second connection type each correspond to a hypertext transfer protocol 1.1 (HTTP/1.1) or H2.

4. The method of claim 2, further comprising:

determining, by the connection pool based on the first pool size and the maximum capacity, a first capacity factor that is indicative of an amount of capacity of the connection pool that is used by each persistent connection of the first connection type to the remote server; and determining, by the connection pool based on the second pool size and the maximum capacity, a second capacity factor that is indicative of an amount of capacity of the connection pool that is used by each persistent connection of the second connection type to the remote server.

5. The method of claim 4, further comprising:

receiving, by the connection pool, an indication that the remote server established the first persistent connection as the second connection type instead of the first connection type; and updating, by the connection pool based on the second capacity factor responsive to receiving the indication, a capacity utilization factor that is indicative of a total amount of capacity of the connection pool that is currently being used by all persistent connections to the client device.

6. The method of claim 5, further comprising:
receiving, by the connection pool from the application, a second request for the second persistent connection of the first connection type to the remote server;
establishing, by the connection pool, the second persistent connection of the first connection type to the remote server; and
granting, by the connection pool to the application, access to the second persistent connection of the first connection type to the remote server.

7. The method of claim 4, further comprising:
updating, by the connection pool based on the first capacity factor responsive to establishing the first persistent connection of the first connection type to the remote server, a capacity utilization factor that is indicative of a total amount of capacity of the connection pool that is currently being used by all persistent connections to the client device.

8. The method of claim 4, wherein
each possible state of the plurality of possible states is indicative of a respective capacity utilization factor for the connection pool, and further comprising:
updating the capacity utilization factor by transitioning from a first possible state of the plurality of possible states to a second possible state of the plurality of possible states.

9. The method of claim 4, wherein the capacity utilization factor exceeds the maximum capacity of the connection pool, and further comprising:
establishing, by the connection pool, the first persistent connection of the first connection type to the remote server even though the establishing of the first persistent connection of the first connection type to the remote server causes the capacity utilization factor to exceed the maximum capacity of the connection pool.

10. The method of claim 4, further comprising:
receiving, by the connection pool from the application, a second request for the second persistent connection to the remote server;
determining, by the connection pool responsive to receiving the second request, that the capacity utilization factor exceeds the maximum capacity of the connection pool; and
maintaining, by the connection pool responsive to determining that the capacity utilization factor exceeds the maximum capacity of the connection pool, the second request in a queue until the capacity utilization factor indicates that the connection pool has an available capacity to provide the second persistent connection to the remote server.

11. The method of claim 1, further comprising:
receiving, by the connection pool from the application, a message indicating that the application has released, to the connection pool, the first persistent connection of the first connection type to the remote server; and
maintaining, by the connection pool responsive to receiving the message, the persistent connection of the first connection type to the remote server.

12. The method of claim 11, further comprising:
receiving, by the connection pool from the application, a second request for a persistent connection of the first connection type to the remote server; and
granting, by the connection pool to the application, access to reuse the first persistent connection of the first connection type to the remote server that the application previously released to the connection pool.

13. The method of claim 1, wherein the granting, by the connection pool to the application, of the access to the first persistent connection causes the application to:
send, via the first persistent connection of the first connection type, a request for one or more computing resources from the remote server; and
receive, via the first persistent connection of the first connection type, the one or more computing resources from the remote server.

14. A system comprising:
a memory; and
a processing device, operatively coupled to the memory, to:
execute a connection pool to manage persistent connections for the client device wherein the connection pool is a state machine that comprises a plurality of possible states corresponding to a plurality of capacity utilization factors, wherein a capacity utilization factor indicates a total amount of capacity of the connection pool that is currently being used by a first connection type and a second connection type of persistent connections, wherein a first persistent connection of the first connection type and a second persistent connection of the second connection type use a different capacity of the connection pool;
execute an application to cause the application to send a request to the connection pool for the first persistent connection of the first connection type to the remote server;
determine, using the connection pool, an available capacity of the connection pool to provide, to the application, the first persistent connection of the first connection type to the remote server;
establish, using the connection pool responsive to determining the available capacity to provide the first persistent connection of the first connection type, the first persistent connection of the first connection type to the remote server; and
grant, using the connection pool to the application, access to the first persistent connection of the first connection type to the remote server.

15. The system of claim 14, wherein the processing device is further to:
receive, using the connection pool from the application, a first pool size of the first connection type and a second pool size of the second connection type; and
determine, using the connection pool, a maximum capacity of the connection pool based on the first pool size and the second pool size.

16. The system of claim 15, wherein the first connection type and the second connection type each correspond to a hypertext transfer protocol 1.1 (HTTP/1.1) or H2.

17. The system of claim 15, wherein the processing device is further to:
determine, using the connection pool based on the first pool size and the maximum capacity, a first capacity factor that is indicative of an amount of capacity of the connection pool that is used by each persistent connection of the first connection type to the remote server;
determine, using the connection pool based on the second pool size and the maximum capacity, a second capacity factor that is indicative of an amount of capacity of the connection pool that is used by each persistent connection of the second connection type to the remote server; and update, using the connection pool based on the first capacity factor responsive to establishing the first persistent connection of the first connection type to the remote server, a capacity utilization factor that is indicative of a total amount of capacity of the connection pool that is currently being used by all persistent connections to the client device.

18. The system of claim 17, further comprising:

receive, using the connection pool, an indication that the remote server established the first persistent connection as the second connection type instead of the first connection type; and update, using the connection pool based on the second capacity factor responsive to receiving the indication, a capacity utilization factor that is indicative of a total amount of capacity of the connection pool that is currently being used by all persistent connections to the client device.

19. The system of claim 18, wherein the processing device is further to:

receive, using the connection pool from the application, a second request for the second persistent connection of the first connection type to the remote server;

establish, using the connection pool, the second persistent connection of the first connection type to the remote server; and grant, using the connection pool to the application, access to the second persistent connection of the first connection type to the remote server.

20. A non-transitory computer-readable medium storing instructions that, when execute by a processing device, cause the processing device to:

execute, by the processing device, a connection pool to manage persistent connections for the client device, wherein the connection pool is a state machine that comprises a plurality of possible states corresponding to a plurality of capacity utilization factors, wherein a capacity utilization factor indicates a total amount of capacity of the connection pool that is currently being used by a first connection type and a second connection type of persistent connections, wherein a first persistent connection of the first connection type and a second persistent connection of the second connection type use a different capacity of the connection pool;

execute an application to cause the application to send a request to the connection pool for the first persistent connection of the first connection type to the remote server;

determine, by the connection pool, an available capacity of the connection pool to provide, to the application, the first persistent connection of the first connection type to the remote server;

establish, by the connection pool responsive to determining the available capacity to provide the first persistent connection of the first connection type, the first persistent connection of the first connection type to the remote server; and grant, by the connection pool to the application, access to the first persistent connection of the first connection type to the remote server.

\* \* \* \* \*